(12) United States Patent
Züger et al.

(10) Patent No.: US 10,114,462 B2
(45) Date of Patent: Oct. 30, 2018

(54) DEVICE AND METHOD FOR ENTERING INFORMATION IN SPORTS APPLICATIONS

(71) Applicant: Kitris AG, Dürnten (CH)

(72) Inventors: Christian Züger, Dürnten (CH); Xavier Michelon, Préverenges (CH); Thomas Moix, Lausanne (CH)

(73) Assignee: Kitris AG, Durnten (CH)

( * ) Notice: Subject to any disclaimer, the term of this patent is extended or adjusted under 35 U.S.C. 154(b) by 0 days.

(21) Appl. No.: 14/787,819

(22) PCT Filed: May 5, 2014

(86) PCT No.: PCT/CH2014/000062
§ 371 (c)(1),
(2) Date: Oct. 29, 2015

(87) PCT Pub. No.: WO2014/179898
PCT Pub. Date: Nov. 13, 2014

(65) Prior Publication Data
US 2016/0077593 A1   Mar. 17, 2016

(30) Foreign Application Priority Data
May 10, 2013   (CH) .......................................... 939/13

(51) Int. Cl.
*G06F 1/16* (2006.01)
*G06F 3/01* (2006.01)
(Continued)

(52) U.S. Cl.
CPC .............. *G06F 3/017* (2013.01); *G06F 1/163* (2013.01); *G06F 1/1694* (2013.01);
(Continued)

(58) Field of Classification Search
CPC .......... G06F 3/017; G06F 3/016; G06F 3/167; G06F 1/163; G06F 1/1694; G06F 1/1698; H04W 88/02
See application file for complete search history.

(56) References Cited

U.S. PATENT DOCUMENTS

| 8,010,911 B2 | 8/2011 | Sohn et al. |
| 8,112,281 B2 * | 2/2012 | Yeung .................... G04C 3/002 704/270 |

(Continued)

FOREIGN PATENT DOCUMENTS

CH   705403 A1   2/2013

OTHER PUBLICATIONS

International Search Report for PCT/CH2014/000062, dated Jul. 2, 2014.

*Primary Examiner* — Mihir K Rayan
(74) *Attorney, Agent, or Firm* — Marshall, Gerstein & Borun LLP

(57) ABSTRACT

A device for sports applications is provided having a housing adapted to be worn on and fixed to the body of a person, and in particular a housing adapted to be worn on and to be fixed to an arm of a person. The device includes a processor and inertial sensors. Inertial sensors are arranged within the housing and connected to the processor and a predetermined characteristic movement of the body of the person is detectable. The detection of the movement provides a user input and/or starts a time frame for entering a command or information into the device during the time frame and the processor updates its state depending on the command or information received during the time frame. By this device it is possible to enter commands or information almost without distraction to the user so that commands or information can be entered during a sports activity, for example during a tennis match.

31 Claims, 4 Drawing Sheets

(51) Int. Cl.
*G06F 3/16* (2006.01)
*H04W 88/02* (2009.01)
*G06F 3/041* (2006.01)

(52) U.S. Cl.
CPC ............ *G06F 1/1698* (2013.01); *G06F 3/016* (2013.01); *G06F 3/041* (2013.01); *G06F 3/167* (2013.01); *H04W 88/02* (2013.01)

(56) References Cited

U.S. PATENT DOCUMENTS

| | | | |
|---|---|---|---|
| 2006/0199659 A1* | 9/2006 | Caldwell | A63B 69/3608 473/221 |
| 2007/0032893 A1* | 2/2007 | Lowran | A63B 71/06 700/91 |
| 2007/0076530 A1* | 4/2007 | Robinett | G04F 1/005 368/107 |
| 2007/0135225 A1* | 6/2007 | Nieminen | A63B 24/0006 473/212 |
| 2009/0164219 A1* | 6/2009 | Yeung | G04C 3/002 704/258 |
| 2011/0032086 A1* | 2/2011 | Cabrera | A41D 20/00 340/323 R |
| 2011/0205156 A1 | 8/2011 | Gomez et al. | |
| 2011/0295547 A1* | 12/2011 | Asada | A61B 5/1118 702/141 |
| 2012/0016624 A1 | 1/2012 | Caritu et al. | |
| 2013/0002538 A1 | 1/2013 | Mooring et al. | |
| 2013/0027341 A1* | 1/2013 | Mastandrea | G06F 3/014 345/173 |
| 2014/0177877 A1* | 6/2014 | Liao | H03F 3/68 381/122 |
| 2014/0206481 A1* | 7/2014 | Zuger | G06K 9/00342 473/463 |

* cited by examiner

DEVICE AND METHOD FOR ENTERING INFORMATION IN SPORTS APPLICATIONS

CROSS-REFERENCE TO RELATED APPLICATIONS

The present application is the United States National Phase of International Patent Application No. PCT/CH2014/000062, filed May 5, 2014, which claims priority to CH 939/13, filed May 10, 2013. The entirety of each of the foregoing priority applications is hereby incorporated by reference.

TECHNICAL FIELD

The present invention applies to the field of user interaction with wearable electronic devices in sports applications.

BACKGROUND ART

Depending on the sports application being considered, a user can greatly benefit from using a wearable device, for instance, for training or performance analysis purposes. One key aspect in such applications is to allow the user to easily interact with the device with no or only a minimal amount of interferences with the performed sports activity. Such interferences may for instance induce a loss of concentration or a break in the flow of the performed sports activity, in either way resulting in lesser performance and efficiency in the performed sports activity. Known user input technologies in electronic devices such as for instance buttons or touch screens are not well suited in most sports applications as they require the user to focus their attention on the device to perform an interaction (for example by searching a button with a finger and/or directly looking at the device to actuate a touch screen). Furthermore, the required compactness and miniaturization of the device to achieve good ergonomics and not to physically hinder natural movements only amplify these difficulties. In certain sports applications these interactions may become even more complicated. For example, in sports applications where the user is holding or wearing pieces of sports equipment (for instance a racket in tennis, a club in golf or gloves in ice hockey), the interactions are awkward or even require releasing or removing pieces of sports equipment. More generally, in most sports applications these interactions require a drastic change of stance to operate the device compared to when performing the sports activity. The disclosed invention solves these drawbacks by using motion based interactions to operate the wearable device.

A major challenge when using motion based user interfaces in sports applications is to find a robust mean to discriminate seamlessly between normal sports activity movements and specific interaction movements with the wearable device. If not correctly addressed, this issue can greatly limit or jeopardize the usability of the motion based user interface in sports applications. Previously disclosed motion based interaction devices and methods, for instance in the fields of remote controls, input devices or gaming interfaces, cannot robustly and efficiently be used in sports applications as they cannot prevent false user inputs being detected by the device (false positives) in the middle of a movement intensive task and/or rely on the user to perform an enabling or triggering action prior to motion recognition. Examples of prior art in remote control, input device or game control fields include a segmentation step that tries to identify a gesture sequence between user triggers (for instance a button pressing) or moments of inactivity. The segmented movement sequence is processed by a gesture recognition method that determines a matching user input (for instance command or information). Other prior art examples introduce the enabling or the extension of the number of available input commands depending on measured sensor values while using additional sensor values to monitor the input movement (for instance defining different spatial planes in which input movements are enabled or represent different input commands). These methods although applicable to their respective fields are either too limiting or unsuited in sports applications where continuous and unpredictable movements are experienced by the device. Examples for devices hardly suitable for scoring use during active sports are U.S. Pat. No. 8,010,911, US-A 2012/0016624, US-A 2011/0205156 and US-A 2013/0002538.

DISCLOSURE OF THE INVENTION

To overcome these limitations, the disclosed invention introduces a novel method of motion recognition specifically adapted for user input in sports applications and in particular suitable for entering sports score information by the player' during a sports game.

This goal is met by a device according to claim 1, by a system according to claim 16 and by a method according to claim 19.

The device is in the disclosed invention an enclosed electronic device comprising at least a processing element (for instance a processor) and all other elements necessary to perform its primary function (for example at least some electronic memory and sensors in a data logger application) according to common knowledge and techniques of those familiar with the art.

In the description of the invention, the term "wearable" when connected to "device" is to be understood as attached to the user's body by any mean such as, but not limited to, a strap, bracelet, adhesive patch or as embedded in any piece of clothing or equipment worn or carried by the user.

The movements of one or several limbs or body parts are measured by at least one movement sensor reading at least one value on at least one direction or axis. This sensor value is read by the processing element of the device in any raw or preprocessed form. For example, the embodiment of the sensor can have embedded computing capabilities and perform a pre-processing in the form of a filtering before outputting its sensor value. In any case, the movement sensors are selected and arranged such in the device that predefined movements of the device can be detected. These predefined movements are defined in such a way that they correspond to a characteristic movement of the player's body and in particular the player's arm, so that the device is able to detect a characteristic movement by the player.

The types of movement sensors, which are in particular inertial sensors, used in the invention may vary depending on the embodiment and on the sports application being addressed. Preferred but non-restrictive embodiments use movement sensors or inertial sensors, respectively, of the MEMS (micro-electromechanical systems) types that are available from various semiconductor manufacturers and can provide precise, compact and cost effective readings of physical values such as, but not limited to, accelerations, angular velocities, forces, pressure levels or magnetic fields. It is understood that depending on the movement or inertial sensor used a calibration step may be necessary.

Although in the preferred embodiment of the invention the sensors are embedded in the device, it is understood that the sensors could in other embodiments be attached to other limbs or body parts as independent wearable devices connected by wires or wirelessly (for instance via radio frequency) to the main device, thus forming a BAN (body area network). It is understood that the disclosed user movement input method is in the preferred embodiment carried out in the wearable device but that preprocessing, formatting or computation steps of the disclosed method could well be performed in independent sensor devices in the case of embodiments with a BAN topology.

Furthermore, it is also understood that although the disclosed user movement input method is in the preferred embodiment carried out in the wearable device, the sensor values in raw or preformatted format or result values of intermediate steps of the user movement input method could in other embodiments be transmitted by wires or wirelessly to an external processing unit. This external processing unit could perform data formatting and/or some or all steps of the disclosed method and possibly send back intermediate and/or final result values of the disclosed method to the device.

The user movement input method disclosed hereafter can be separated in three steps: a user input movement potential start detection step, a user input movement validity check step and a user input movement recognition step. It must be understood that depending on the embodiment some or all steps of the disclosed user movement input method may be implemented in a single processing step or flow.

In preferred embodiments, the disclosed user movement input method, when enabled, is intended to be run online continuously (time wise) on the available sensor values although it may also be used on buffered motion segments (arrays of sensor values) after any segmentation method determining the start and end of a potential user input movement.

It is understood that the disclosed method does not require but may use methods using the sensor values to compute postures, trajectories or any alternate spatial representations on which to perform the different steps of the disclosed method. It is also to be understood that using computed spatial representations may not be well suited in applications with continuous and unpredictable movements such as sports applications due in most cases to the use of mathematical integrations which might for instance require a proper segmentation strategy with knowledge of initial conditions or be mapped for recognition on a well-known movement data set by warping methods. Thus, such approaches using computed spatial representations could become too computational heavy to be carried out in the wearable device and may not be necessary for the robust recognition of simple and intuitive movements (for example hand tapping on the body or arm twisting). In the preferred embodiment of the invention, the raw or preprocessed sensor values are directly used by the disclosed method.

The potential start of a user input movement is detected by using at least one of the sensor values available in the wearable device. A non-limiting example method of potential start detection of user inputs may be the use of a threshold method on one or a plurality of raw or preformatted sensor values (for instance the absolute value of sensor values) or on any combination of these values. In this example, a potential start may for instance be detected if all considered sensor values have concurrently reached their respective thresholds or if a sequence of threshold crossing and non-crossing events is observed in given time frames (for instance in a state machine based method).

The user input movement validity check step may be performed at any point once a potential user input is detected until the user input movement recognition step is finished and a final corresponding (if any) input command or information is validated. The user input movement validity check step is an assessment that verifies if a potential user input movement must be taken into account or discarded. The user input movement validity check step relies on at least one of the sensor values available to the wearable device. The user input movement validity check step may use sensor values at a point of time before, at or during a period of time prior to the potential start of a user input movement (depending on the embodiment and/or on the considered sports application). It is to be understood that if different sensor values or combinations of sensor values are used that the time or period time taken into account by the method can vary between the different sensor values or combinations of sensor values. The user input movement validity check step may include a sequence of such described assessments at different points in time and/or using different sensor values or combinations of sensor values.

Although a potential user input movement could well be directly discarded after a potential start is detected and the disclosed method reset and restarted, the disclosed method preferably processes the whole potential user input movement with the user input movement recognition step before a validity decision is applied to increase the practical robustness of the disclosed method.

Similarly alternate embodiments of the validity check step could perform one or several assessments during the potential movement itself (for example to verify that certain sensor values remain bounded) or at a point of time after, at or during a period of time after the potential end of a user input movement. It is understood that such embodiments could also use combinations of assessment methods as previously disclosed.

A non-limiting example method of movement validity check of user inputs may be the use of a range checking method (for instance using a central value and a tolerated variation around this central value) on one or a plurality of raw or preformatted sensor values (for instance the absolute value of sensor values) or on any combination of these values. In this example, a potential user input movement may for instance be found as valid if all considered sensor values are concurrently in their respective ranges.

The user input movement recognition step is performed by using at least one of the sensor values available in the wearable device. A non-limiting example method of user input movement recognition may be the use of a threshold method on one or a plurality of raw or preformatted sensor values (for instance the absolute value of sensor values) or on any combination of these values. In this example, a state machine method may be used to detect a given sequence of state transitions according to events defined as single or multiple concurrent values (the value(s) of interest may be state dependent) reaching respective thresholds. A movement is recognized when a specific state is reached, meaning a given movement sequence is completed. The end of the potential movement is in this example considered when no sate transition is detected for a given set time (that may depend on the current state). Furthermore, a method such as described in this example may enable to detect multiple repetitions of a given user input movement until completion (depending on the state machine structure) offering the possibility to handle multiple entries directly with a single user input movement validity check step.

It is understood that the sensors values used in the different steps of the disclosed method may be different in each step (for example different axis of measurements and/or physical sensors).

It is also understood that the disclosed device may work with a plurality although a bound set of different user input movements. To this aim the disclosed method and its steps can be modified to handle a plurality of user input movements. Alternatively, multiple instances of the disclosed method may be run on the device to handle a plurality of user input movements and in such an embodiment the different instances may share one or more steps of the disclosed method.

It is thus in particular preferred that a predefined movement leads directly to a specific action of the device or in the method, for example leads directly to an updating of a scoring information.

It must become apparent for one skilled in the art that the choice of the considered user input movement (for instance according to occurrence probabilities of similar movements in the performed sports activity) and of the different sensors values (for instance the choice of the sensor type(s) and/or axis of measurement) is of critical importance for the performances and robustness of the disclosed invention in a specific application.

BRIEF DESCRIPTION OF DRAWINGS

The above and other features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

As further illustration of the disclosed invention a detailed example embodiment and its variants for the field of tennis is given hereafter. The user, referred to as player in this example, is wearing the device on one of his wrists as illustrated in FIGA, either on the striking (arm on which the tennis racket is hold) or non-striking arm. The device 200 illustrated in FIG. 2 is fastened in place by mean of an elastic strap that can be adjusted and secured in place with a Velcro® locking system through the buckles 207 and 208.

In this example the device implements the function of a tennis score tracking system. As there are no means to automatically detect points in a tennis match using the device itself, the user has to input all point information into the device as well as optional complementary point information (for instance how the point was won or lost) to provide details for match statistics and analysis. Although the player has according to present official tennis rules 25 seconds between two rallies, the manipulation of the device through conventional means (for instance buttons) is very awkward while holding the tennis racket and induces a loss of focus in the tennis match for the player. Additionally, possible sweating and high heart frequency generated by the sports activity tend to make it even more difficult to manipulate the device efficiently. To solve this issue the example embodiment relies on user input movements and voice command recognition thus enabling the player to enter information into the device in a natural and seamless way while for instance walking to pick up a ball or to get back in position.

Figure 2:
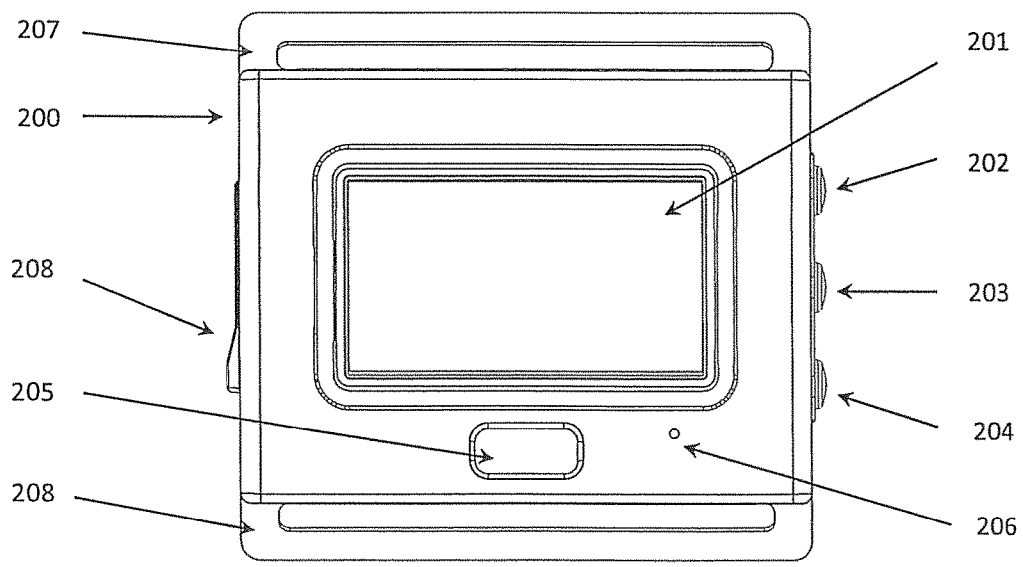
FIG. 2 illustrates the top view (front panel) of the electronic device attached to the wrist of the user in the embodiment example of FIG. 1.

The device 200 illustrated in FIG. 2 includes a display 201 presenting a graphical user interface to the player. This graphical interface can for instance be used to setup the different device parameters (some of which may be related to the disclosed invention) or start a match score tracking session through menus or simply display time when the device is idle. When the score tracking system is in use, the display provides the match score information. Buttons located on the top, button 205 and on one side, buttons 202, 203 and 204, of the enclosure of the device enable conventional interactions with the device at all time. The device also includes a user feedback element in the form of a vibration motor (in alternate embodiments an audio feedback element may be combined with or replace the vibration motor). A microphone with a port on the device enclosure 206 is embedded in the example device enabling the recording of audio data and a voice command user input feature.

Figure 1:
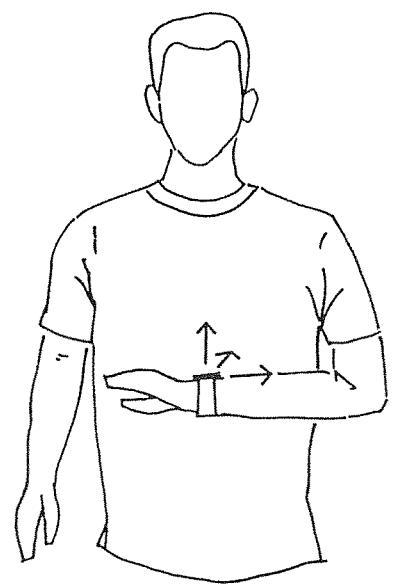
FIG. 1 illustrates an example embodiment of the invention where the user wears an electronic device at his wrist. Three orthogonal arrows represent the movement measurement directions or axis provided by the sensor(s) embedded in the embodiment example.

The device 200 includes two MEMS inertial sensors: a three orthogonal axis accelerometer and three orthogonal axis gyroscope (providing angular rates). In the example embodiment the two sensors are physically positioned in the device so that they have one measurement axis aligned with the arm of the player when the device is worn as illustrated in FIG. 1. The two sensors have digital outputs that can be accessed by the processor of the device through a standard serial bus interface. This leads to six different sensor values that can potentially be used by the user input movement method. It is to be understood that in alternate embodiments the sensors could be aligned differently although in practice an alignment with the natural movement axis of the limbs or body parts to which the sensors are attached greatly simplifies the user input movement method.

In the considered example the user input movement method is only in use when the score tracking application is running on the device. Since the sensor values are continuously accessed by the processing element of the device when the score tracking application is running to perform the disclosed method, they may be logged in a non-volatile memory in the device enabling a data logging functionality to the device.

The device 200 illustrated in FIG. 2 includes a USB communication port that enables the device to be connected to a host in order to retrieve logged information (for instance match score logs or sensor values) or to setup the device remotely with the help of a dedicated application program (for instance running on the host or on a remote service connected to the host). The USB connector is protected by the retractable lid 208 located on one side of the device enclosure.

Variants of the example embodiment are presented below illustrating how the player can input point and complementary point information into the device using the disclosed invention. It is to be understood that it may be possible for the player to select or, if applicable, enable either one of the variants through setup parameters of the device (either through a menu of the device graphical user interface or with an external application when connected to a host by USB).

In the first variant of the example embodiment, a single user input movement is defined. The user movement is used by the player to trigger an activation of the device when the score tracking application is running. Once such activation is detected, the device enables the voice command recognition method and waits for a voice command defining if the player won or lost the current point. The device processing elements updates the match score according to the user voice command input. If in a given time frame no voice command is detected or if a non-valid voice command is detected (according to a predefined command library), the device keeps the current score and stops the point entering process at this step. When a point is successfully entered, the player is given a time frame to perform a second user input movement (in this example we consider the same movement but it is understood that a different movement could be used in an alternate embodiment). If the player triggers a second activation in this time frame the voice recognition method is enabled a second time with a different library of voice commands corresponding to complementary point information. If in a given time frame no voice command is detected or if a non-valid voice command is detected, the device processing element considers that the point complementary information is not available. When the described point input sequence is finished, the device processing element logs the point event, a timestamp (corresponding to the time at which the point activation was detected) and, if available, the complementary point information. The user is provided with a haptic feedback using the vibration motor included in the device after each activation and voice command recognition step. When the point is entered a different feedback vibration sequence is used if the point is recognized as won or lost (in this case no vibration feedback is provided to the player if no voice command is given or if a wrong voice command is detected). When entering complementary point information a different feedback vibration sequence is used if the voice command recognition was successful or failed. The vibration feedback in this example embodiment enables the user to interact with the device without having to lose focus by looking at information provided on the display.

Figure 3A:
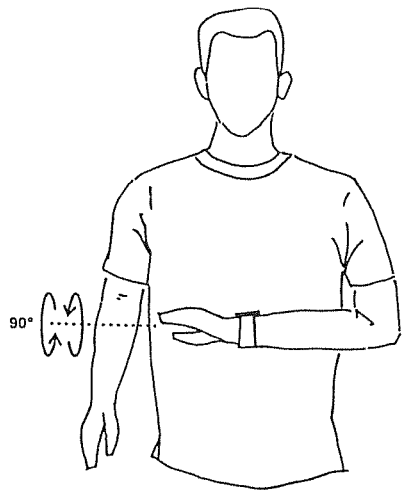
FIG. 3a, FIG. 3b, FIG. 3c and FIG. 3d illustrate example user movement inputs that may be considered in the embodiment example of FIG. 1. The illustrated movements are in the respective figure order a horizontal arm twist, an arm rotation from horizontal position to vertical up position and back, a vertical up arm twist and a vertical down arm twist.

In the first variant of the example embodiment, the single user input movement is defined to be a twist of the arm wearing the device with the arm positioned in the horizontal plane (with respect to ground) as illustrated in FIG. 3*a*. The arm twist is defined as first a rotation of the arm in the direction going away from the player body followed by a return movement to the initial position. It is to be understood that in an alternate embodiment or in another variant of the example embodiment the twist movement defined first as a rotation of the arm in the direction towards the player body followed by a return movement to the initial position may also be used although proving physically more difficult to perform for the player. The choice of this movement is the result of a careful evaluation of logged sensor data and practical tests with various tennis players to provide a robust activation movement.

Figure 4A:
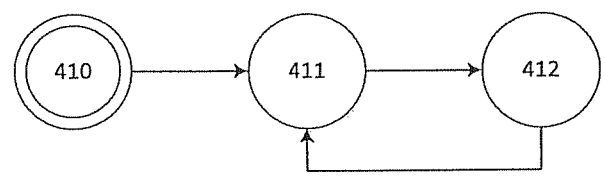
FIG. 4a and FIG. 4b illustrate two state machine topologies that may be used in example embodiments of the disclosed method. Rounds represent states of the state machines while arrows indicate the direction of allowed conditional transitions.

In the first variant of the example embodiment, the potential start of a user input movement and the user input movement recognition steps of the disclosed invention are fused into a common state machine method and use the sensor value from the gyroscope corresponding to the rotation axis of the described twisting motion (rotation axis aligned with the arm of player on which the device is attached as illustrated in FIG. 1). An example topology of such a state machine is illustrated in FIG. 4*a*. The state machine remains in an initial reset state 410 until the considered sensor value reaches a given threshold. When the threshold is reached the potential start of user input movement is triggered and the state machine enters its movement recognition part. In this example the user input movement is defined as a sequence of states (411 and 412 in the example of FIG. 4*a*) with sequential transitions. It is to be understood that in more complex embodiments dealing with several user input movements non sequential transitions may also be used. When the current state of the state machine reaches the final state 412 of the sequence a user input movement is considered completed. In this example the final state is connected again by a transition to the first state 411 of the movement sequence to enable the detection of multiple instances of the user input movement. A time frame is allowed for staying in each state of the state machine. When the time frame is elapsed, the state machine is reset to its initial state and, only if the movement sequence is found valid by the user input movement validity check step, the number of completed user input movements forwarded to the score tracking application running on the device. In the considered example the user input movement is defined as a sequence of two states (411 and 412) with transitions criteria corresponding to reaching different thresholds (for instance one positive and one negative threshold).

In the first variant of the example embodiment, the user input movement validity check step uses the sensor value from the accelerometer of the axis aligned with the arm of player on which the device is attached (as illustrated in FIG. 1). The validity of the potential user input is determined by testing if the sensor value right before the detected potential start of the user input movement is within a given margin around a given value (corresponding in the described topology to the arm being in horizontal position). In variants of the example embodiment, the validity check can be extended to improve robustness as a combination of assessments. Additional assessments could for example include the verification that during the potential user input the read absolute values of the gyroscope on one or several axis that are not used to measure the movement remain bounded below a given value and/or a second check on the accelerometer value as described previously but at the end of the potential user input.

In a second variant of the example embodiment, two user input movements are defined. As with the first variant the player can use the user input movements as activation of the device but in the second variant the choice of the performed movement directly defines if the current point was won or lost. In either case, the voice recognition method is enabled with a library of voice commands corresponding to the complementary point information. If in a given time frame no voice command is detected or if a non-valid voice command is detected, the device processing element considers that complementary point information is not available. When the described point input sequence is finished, the device processing element logs the point event, a timestamp (corresponding to the time at which the point activation was detected) and, if available, the complementary point information. The user is provided with a haptic feedback using the vibration motor included in the device. When a user input movement is recognized a different feedback vibration sequence is used if the point is recognized as won or lost. When entering complementary point information a different feedback vibration sequence is used if the voice command recognition was successful or failed.

Figure 3B:
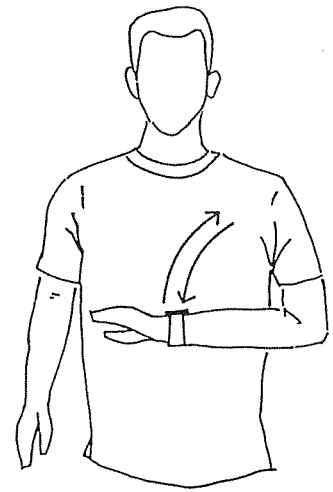
Figure 3C:
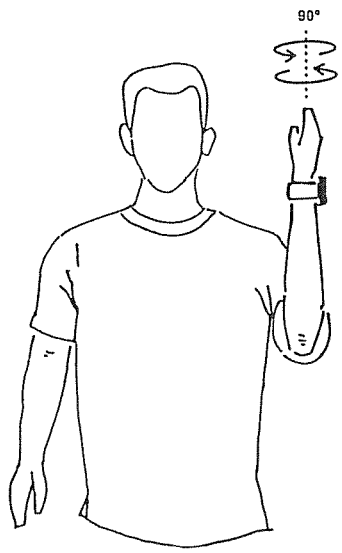
Figure 3D:
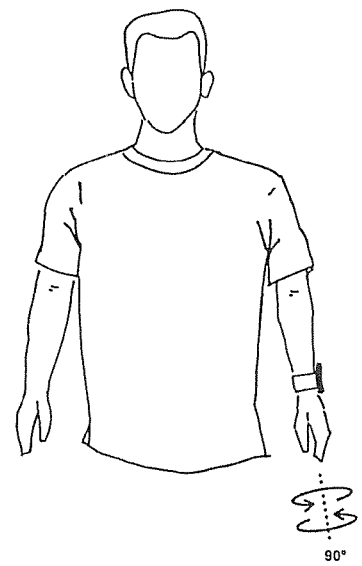

In the second variant of the example embodiment, the user input movements are defined as being an arm twist movement as described in the first variant (and illustrated in FIG. 3a) and a similar arm twist movement but with the arm on which the device is attached being in a vertical up position (as illustrated in FIG. 3c). In an alternate embodiment or variant of the embodiment example a twist with the arm in vertical down position as illustrated in FIG. 3d may also be used as a user input movement. It is understood that other twist movements could be defined at different arm angles depending on the application and that the disclosed variant could possibly work with any two of these twist movements.

Since the nature of the user input movements used in the second variant are both similar twists, the potential start of a user input movement and the user input movement recognition steps of the disclosed invention are identical as with the first variant of the example embodiment.

In the second variant of the example embodiment, the user input movement validity check step uses the same sensor value as in the first variant of the example embodiment. The validity of the potential user input movement is extended to test the validity of the two defined user input movement. Two tests are performed to check if the considered sensor value right before the detected potential start of the user input movement is in given ranges of two central values corresponding to the arm being horizontal or vertical (it is understood that the tests are in this case made on the same sensor value and that the parameters of the tests should preferably be chosen to prevent the possibility of detecting two different valid user input movements at the same time). If the user input movement recognition step finds a number of user input movement instances, the number of detected instance and the type of user input movement is forwarded to the application running on the device (it is understood that if both user input movements are recognized as valid due to overlapping test parameter settings a mitigation method must be included for the final command decision).

In a third variant of the example embodiment the mode of operation of the second variant is extended to enter the complementary point information without using the voice recognition feature. Similarly as with the second variant two user input movements are defined to enter the point information (won or lost). After the point information is entered the user is given a time frame to enter a second user input movement defining the complementary point information. In the considered example three point characteristics (for instance winner, forced error, unforced error) are defined corresponding to three user input movements. It is to be understood that the point characteristics can have different meaning depending on the actual status of the tennis match (for instance when the player is serving or returning). It is also to be understood that some user input movements can be shared between the point information and the complementary point information inputs as illustrated hereafter.

In the third variant of the example embodiment, the user input movements used for entering the point information are defined to identical as with the second variant of the example embodiment. A third user input movement, a twist with the arm in vertical down position as illustrated in FIG. 3d, is introduced when entering the complementary point information. Since the nature of the additional movement is the same as with the second variant of the example embodiment, the only modification required is an extension of the user input movement validity check step of the second variant in order to handle the third user input movement with the arm in vertical down position. Thus, a third range test corresponding to the arm in vertical down position is included. The user input movements method when successfully completed transmits the number of detected user input movements and their type to the score tracking application running on the device. Depending on the expected user input (either point or complementary information) the application can choose to discard some types of user input movements. It is understood that this last filtering operation may also be possibly implemented in the user input movement validity check step if it includes for instance enabling parameters for some or all defined user input movement types or if this step implements the logical chain of command inputs (point information followed by a given time frame for complementary point information).

It is understood that, in other embodiments, the previously described variants may be extended to cope with longer information input sequences. For instance, the position of the player on the tennis court when the point is won could be considered as a third level complementary information. In such a scenario, the player would be able to activate the device a third time in a given time frame after the first complementary information (how the point is won) is entered to enter the position on the court using one or several of the disclosed techniques.

It is understood that in the variants of the example embodiment one or several voice recognition steps may be replaced by an audio recording of the information (triggered by the user input movement). Similarly, a defined user input movement may in other embodiments trigger an audio recording. In both cases this recorded audio information could later be retrieved (for instance in the example embodiment through the USB port) for post treatment (for instance including but not limited to voice recognition) or audio playback. It is understood that the post treatment or playback may be performed either on the device itself or on an external device (for instance host computer).

In the fourth variant of the example embodiment, an additional user input movement is defined to be used in conjunction with either variant described previously. The additional user input movement can be used by the player to trigger a specific command to undo a previously entered point. This feature can for instance be very helpful to correct a point that was just previously entered erroneously without having to use the buttons and menus of the graphical user interface of the device. When the user input movement corresponding to the undo function is detected, the score tracking application automatically removes the last entered point information and, if any, the corresponding complementary point information (or alternatively marks the point as cancelled in the match log) and updates the match score accordingly.

In an alternate example embodiment the fourth variant can be modified to behave as a "back" functionality that enables the user, instead of removing the last entered point, to remove only the last entered information (meaning either point or complementary point information).

Figure 4B:
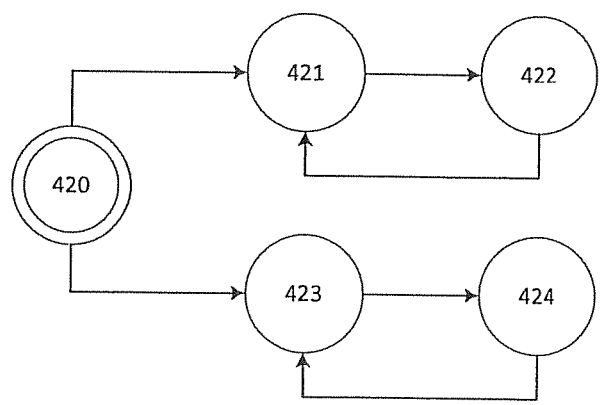

In the fourth variant of the example embodiment, the additional user input movements is defined as being an arm rotation from a horizontal position to a vertical up position and back as illustrated in FIG. 3b. The nature of the additional user input movement being different from the arm twists described previously the potential start of a user input movement and the user input movement recognition steps have to be extended accordingly. An additional gyroscope sensor value corresponding to the rotation axis of the arm from horizontal to vertical has to be considered. In this example the initial state of the state machine implementing the potential start of a user input movement and the user input movement recognition steps monitors the two considered gyroscope sensor values. The arm twisting and the arm rotation input movement recognition step is in this example implemented by two independent sub state machines connected to the initial state 420 of the state machine illustrated in FIG. 4b. The detection of the start of the movement is performed by checking both gyroscope sensor values against respective thresholds. When one of the sensor values reaches its respective threshold a transition to the corresponding sub state machine is triggered (it is understood that if both sensor values reach their respective threshold concurrently a mitigation method must be used). In the example illustrated in FIG. 4b the first sub state machine is formed by the states 421 and 422 and the second by the states 423 and 424. Each sub machine behaves similarly as described in the previous variant examples. It is to be understood that in different embodiments or with different user input movements different state machine topologies may be used. Additionally, the user input movement validity check step of the variant used in conjunction with the fourth variant can directly be used since the arm rotation user input movement illustrated in FIG. 3b starts with the arm in horizontal position as it is the case with the horizontal arm twisting illustrated in FIG. 3a and used in other variants. Finally, when one or more user input movement instance are detected, the user input movement type can be determined based on the result of the user input movement validity check step and on which sub state machine was triggered.

It is understood that any of the variants of the disclosed embodiments could similarly rely on the use of multiple instances or iterations of the described input movements (for example a double horizontal twist). Depending on the embodiment these multiple movements can be considered as a number of iteration of the corresponding single movement (in this case possibly enabling the use of both single or multiple inputs using the same processing steps) or can be defined as new input movements in the sense of the disclosed processing steps (thus requiring their own dedicated processing logic).

Figure 5:
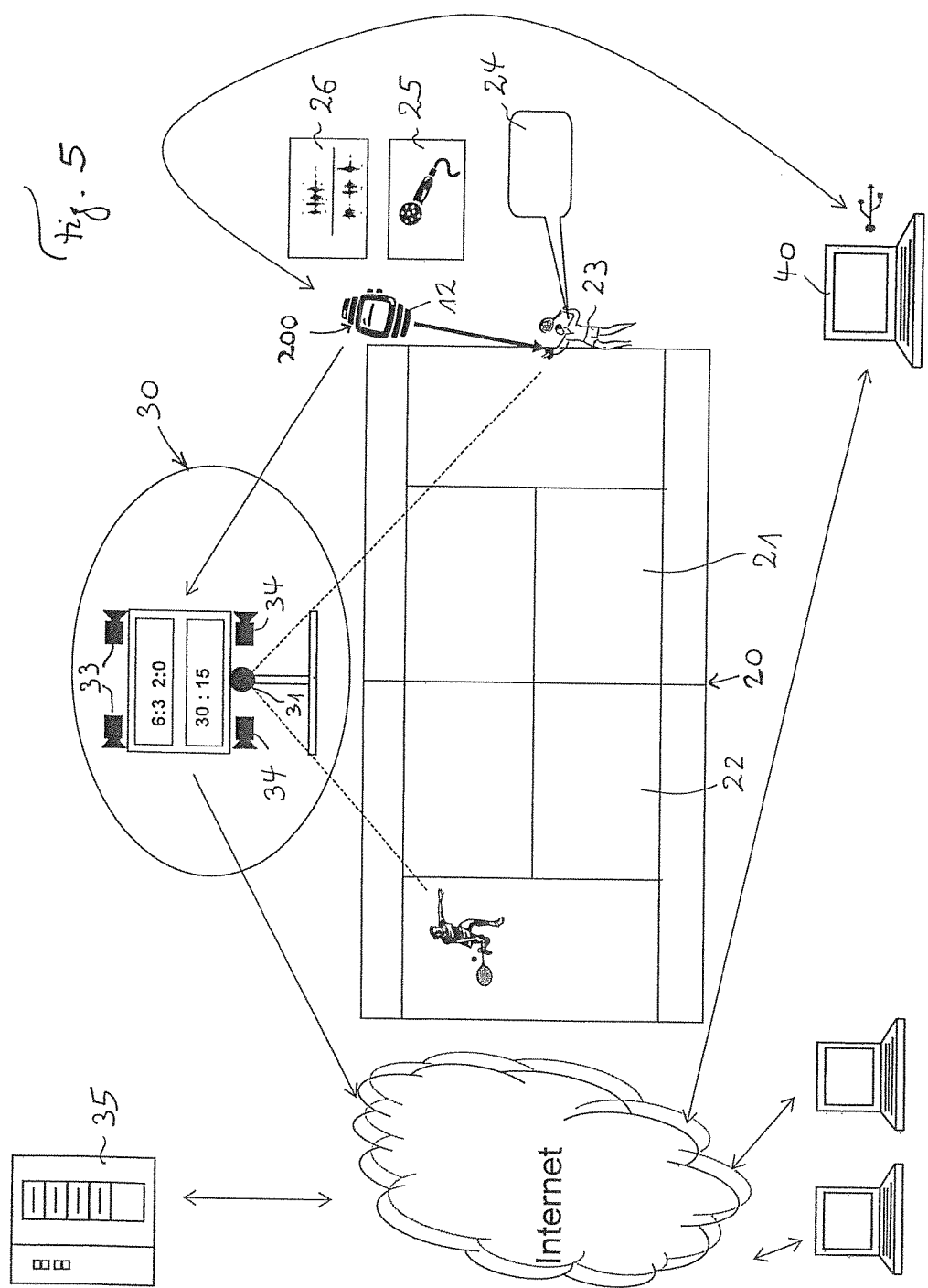
FIG. 5 shows schematically a tennis court and a device according to the present invention and additional devices for keeping track of the tennis score and analyzing the game.

FIG. 5 shows schematically a tennis court 20 with the two sides 21 and 22. The player 23 wears as previously explained a device 200 on his arm shown by the enlarged device 200 and the arrow pointing to the arm. Box 24 and the boxes 25 and 26 are shown to represent speech input by the player as has been explained.

It is possible to keep track of the score and to record complementary point information as explained by the device alone. It is then possible to connect the device after the match to an external device 40 (for instance a computer) to read the match data. The match data can be analysed on the external device or can be transmitted to a server 35 for analysis.

As a further element a tennis game base station 30 can be provided. In the following both examples are described. The device 200 is mentioned as KIT and the tennis game base station as BASE. The server 35 is mentioned as SERVER. It may as well be to use additionally to the BASE or instead of the Base a computing device such as for example a personal computer, a smartphone or a tablet computer.

Two cases are possible: Case A—BASE 30 is provided. Case B—BASE 30 is not provided. In Case A KIT 10 may work together with BASE 30.

A wireless connection of KIT 10 with BASE 30 is provided by circuits in these elements, for example a wireless connection is established by a Bluetooth connection. A pairing and synchronisation process is provided between the KIT and the BASE by means known to the skilled person. BASE may collect further information as for example Video signals from video cameras 33 and 34, if provided, and position data of one or both of the players if a position detection is provided.

Depending on the configuration and scenario, KIT can transmit match data (for example score and complementary point information) live to BASE and/or to SERVER and/or to another external device if a wireless connection of KIT with respectively BASE and/or SERVER and/or another external device is provided by circuits in these elements.

The match data from KIT may in any case still be retrieved and possibly uploaded to SERVER as previously explained or, if a wireless connection of KIT with another external device is provided by circuits in these elements, to another external device that may possibly upload the match data to SERVER.

Match data collected by BASE (own match data if the case may be and the match data transmitted by KIT if any) may be transmitted live to SERVER if the speed and quality of an internet connection allows or may be transmitted later to SERVER by other means known to the skilled person.

It is also understood that in other system embodiments the upload step or live transmission to SERVER of match data collected by BASE and/or KIT could be carried out by KIT or another external device if wireless connections are provided by circuits in these elements similarly as discussed previously.

In case B KIT 10 works alone. All data is transferred to an external device 40 and can be uploaded to SERVER 35 as previously explained or by means of wireless connections of KIT with SERVER and/or an external device if provided by circuits in these elements as previously explained in case A.

The invention claimed is:

1. A device for entering commands and information and for tracking tennis match score and data, the device comprising:
   a housing adapted to be worn on and to be fixed to an arm of a person,
   a processor arranged within the housing, and
   movement sensors arranged within the housing and connected to be in signal connection with the processor, wherein the movement sensors and the processor are arranged and adapted to detect a predetermined movement of the arm of the person out of a set of predetermined movements during a tennis match, wherein the predetermined movement of the arm includes each of the following: an arm twist with the arm in a horizontal position, an arm twist with the arm in a vertical up position, and an arm twist with the arm in a vertical down position, and wherein the detection of the movement of the arm can either:
   (a) be interpreted by the processor as a command or information input, or
   (b) start a time frame controlled by the processor, wherein the time frame elapses after a period of time, and allow a defined interaction with the device during the time frame and wherein the processor is adapted to update its state depending on the interaction performed during the time frame, or (c) be interpreted by the processor as a command or information input while starting a time frame controlled by the processor, wherein the time frame elapses after a period of time, and allowing a defined interaction with the device during the time frame and wherein the processor is adapted to update its state depending on the interaction performed during the time frame.

2. The device according to claim 1 including at least one element providing visual feedback connected to the processor.

3. The device according to claim 1 including at least one element providing audio feedback connected to the processor.

4. The device according to claim 1 including at least one element providing haptic feedback connected to the processor.

5. The device according to claim 1 wherein a defined interaction in a time frame starts a new time frame controlled by the processor and allowing a new defined interaction with the device during the new time frame and wherein the processor is adapted to update its state depending on the new interaction performed during the new time frame.

6. The device according to claim 1 wherein the movement sensors and the processor are adapted to detect a predefined movement during a time frame and are adapted to detect this predefined movement as a command or information and/or to start a new time frame controlled by the processor and allowing a new defined interaction with the device during the new time frame and wherein the processor is adapted to update its state depending on the new interaction performed during the new time frame.

7. The device according to claim 1 wherein at least one predefined movement is either:
   a movement of the device resulting from a movement of the arm from horizontal position to one vertical position, or
   a movement of the device resulting from a movement of the arm from one vertical position to a horizontal position,
   with or without returning to the original arm position in both cases.

8. The device according to claim 1 including a microphone connected to the processor and wherein the processor and the microphone are active for receiving a spoken command as an interaction during a time frame.

9. The device according to claim 1 including at least one user input element to provide an interaction.

10. The device according to claim 1 wherein the device includes a wireless communication arrangement connected to the processor.

11. Use of the device according to claim 1 for tracking a tennis match score and data.

12. The device according to claim 1 wherein the movement sensors comprise at least one three-orthogonal axis accelerometer.

13. The device according to claim 1 wherein the movement sensors comprise at least one three-orthogonal axis gyroscope.

14. The device according to claim 1 wherein the movement sensors comprise an accelerometer and a gyroscope, wherein the accelerometer and the gyroscope are physically positioned such that the accelerometer and the gyroscope each include a same measurement axis, the same measurement axis aligned with the arm of the person.

15. A system including at least one device according to claim 1 and one or several of:
   a base station (30) including a computing element and a wireless communication arrangement adapted to connect to the wireless communication arrangement of the at least one device and to exchange data with the device,
   a server including a computing element and a wireless communication arrangement adapted to connect to the wireless communication arrangement of the at least one device and to exchange data with the device, or
   a computing device, the computing device including a computing element and a wireless communication arrangement adapted to connect to the wireless communication arrangement of the at least one device and to exchange data with the device.

16. A system according to claim 15 where at least one of the base station (30) or the computing device includes at least one feedback element providing at least one of visual feedback or audio feedback, and wherein the at least one of the base station (30) or the computing device can remotely operate the at least one feedback element.

17. Use of a system according to claim 15 for tracking a tennis match score and data.

18. A method for entering commands and information for tracking tennis match score and data by a device (200) comprising:
   a housing adapted to be worn on and to be fixed to an arm of a person,
   a processor arranged within the housing, and
   movement sensors arranged within the housing and connected to be in signal connection with the processor, wherein the movement sensors and the processor are arranged and adapted to detect a predetermined movement of the arm of the person out of a set of predetermined movements during a tennis match, wherein the predetermined movement of the arm includes each of the following: an arm twist with the arm in a horizontal position, an arm twist with the arm in a vertical up position, and an arm twist with the arm in a vertical down position, and wherein the detection of the movement of the arm can either:
   (a) be interpreted by the processor as a command or information input, or
   (b) start a time frame controlled by the processor, wherein the time frame elapses after a period of time, and allow a defined interaction with the device during the time frame and wherein the processor is adapted to update its state depending on the interaction performed during the time frame, or
   (c) be interpreted by the processor as a command or information input while starting a time frame controlled by the processor, wherein the time frame elapses after a period of time, and allowing a defined interaction with the device during the time frame and wherein the processor is adapted to update its state depending on the interaction performed during the time frame.

19. The method according to claim 18 wherein the device includes at least one element providing visual feedback connected to the processor.

20. The method according to claim 18 wherein the device includes at least one element providing audio feedback connected to the processor.

21. The method according to claim 18 wherein the device includes at least one element providing haptic feedback connected to the processor.

22. The method according to claim 18 wherein a defined interaction in a time frame starts a new time frame controlled by the processor and allowing a new defined interaction with the device during the new time frame and wherein the processor is adapted to update its state depending on the new interaction performed during the new time frame.

23. The method according to claim 18 wherein the movement sensors and the processor are adapted to detect a predetermined movement during a time frame and are adapted to detect this predetermined movement as a command or information and/or to start a new time frame controlled by the processor and allowing a new defined interaction with the device during the new time frame and wherein the processor is adapted to update its state depending on the new interaction performed during the new time frame.

24. The method according to claim 18 wherein at least one predetermined movement is either
   a movement of the arm from horizontal position to one vertical position or
   a movement from one vertical position to a horizontal position
   with or without returning to the original arm position.

25. The method according to claim 18 wherein the device includes a microphone connected to the processor and wherein the processor and the microphone are active for receiving a spoken command as an interaction during a time frame.

26. The method according to claim 18 wherein the device includes at least one user input element to provide an interaction.

27. The method according to claim 18 wherein the device includes a wireless communication arrangement connected to the processor.

28. The method according to claim 18 wherein the device is used for tracking a tennis match score and data.

29. The method according to claim 18 wherein the movement sensors comprise at least one three-orthogonal axis accelerometer.

30. The method according to claim 18 wherein the movement sensors comprise at least one three-orthogonal axis gyroscope.

31. The method according to claim 18 wherein the movement sensors comprise an accelerometer and a gyroscope, wherein the accelerometer and the gyroscope are physically positioned such that the accelerometer and the gyroscope each include a same measurement axis, the same measurement axis aligned with the arm of the person.

* * * * *